Feb. 15, 1966   E. O. KALIL ETAL   3,235,184
VECTORING NOZZLE
Filed March 20, 1963   3 Sheets-Sheet 1
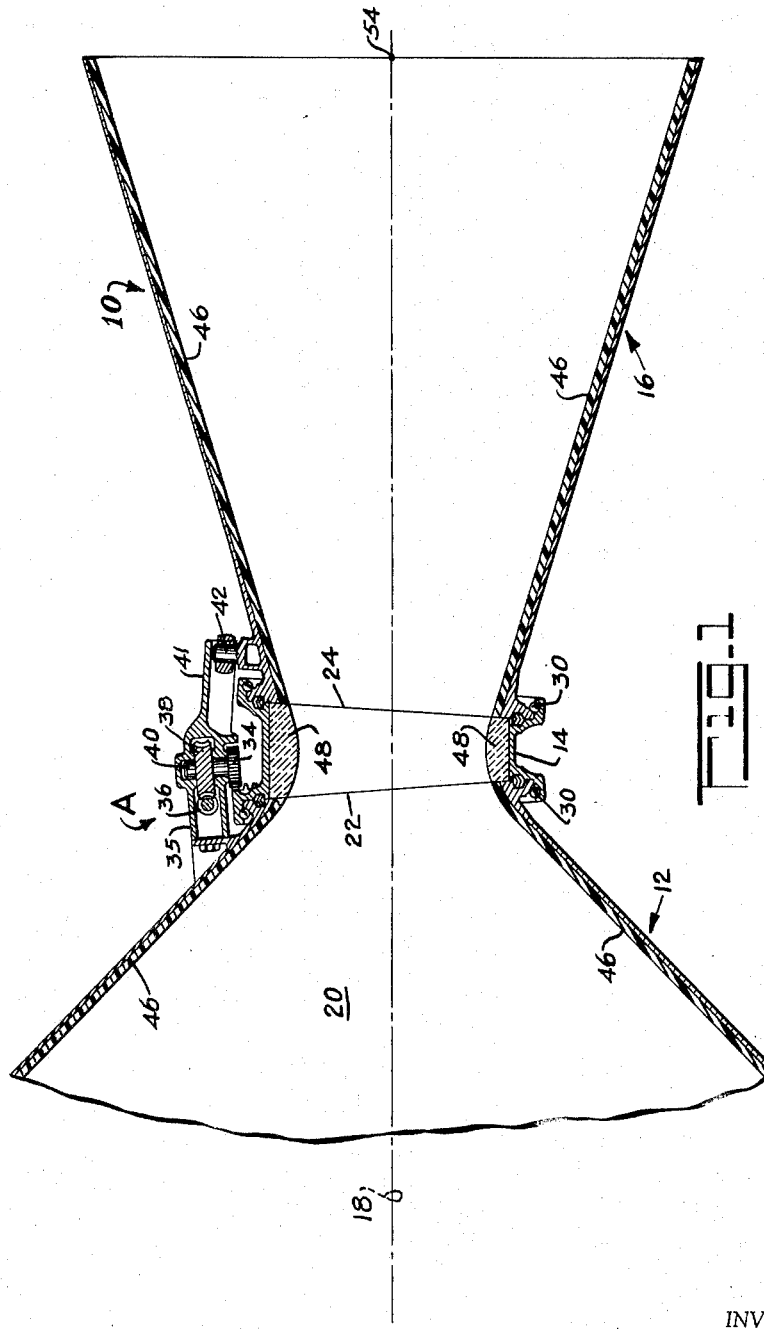
INVENTORS
EMIL O. KALIL
RUSSELL W. GREGORY
BY
Thomas W. Kennedy
ATTORNEY

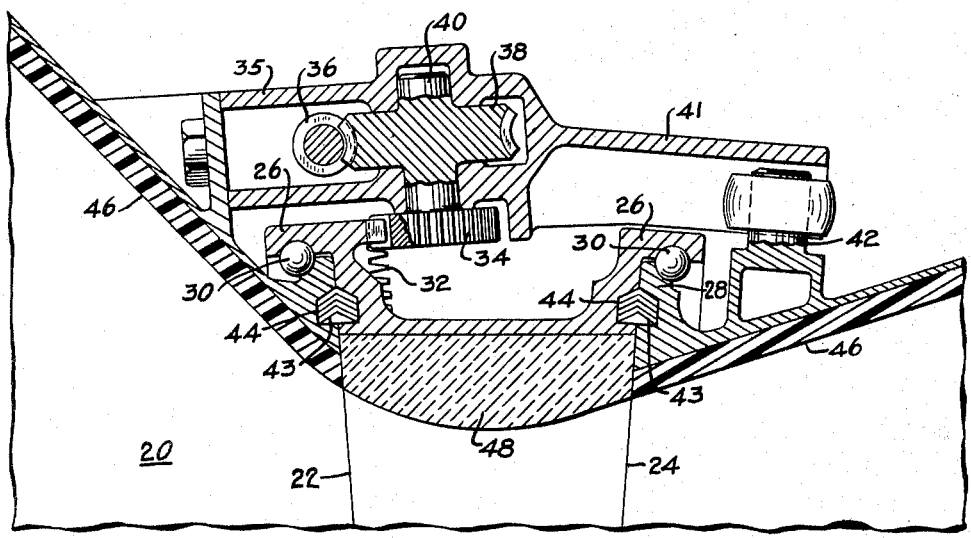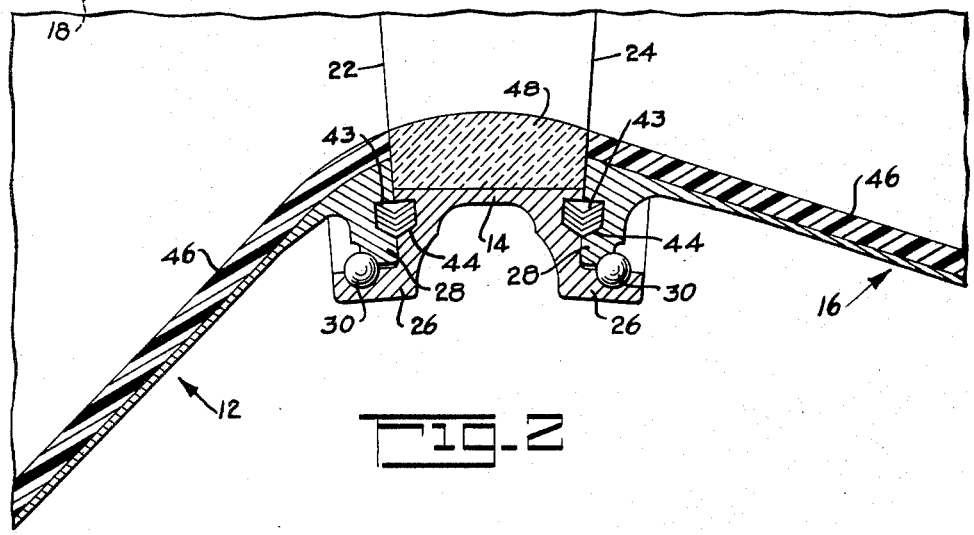

Feb. 15, 1966   E. O. KALIL ETAL   3,235,184
VECTORING NOZZLE

Filed March 20, 1963   3 Sheets-Sheet 3

INVENTORS
EMIL O. KALIL
RUSSELL W. GREGORY
BY
*Thomas W. Kennedy*
ATTORNEY

# United States Patent Office 3,235,184
Patented Feb. 15, 1966

3,235,184
VECTORING NOZZLE
Emil O. Kalil, Woodland Hills, Calif., and Russell W. Gregory, Upper Saddle River, N.J., assignors to Curtiss-Wright Corporation, a corporation of Delaware
Filed Mar. 20, 1963, Ser. No. 266,880
1 Claim. (Cl. 239—265.35)

This invention relates to rockets and is particularly directed to a vectoring nozzle for a rocket engine.

Control of the direction of thrust of a rocket or other jet engine can be accomplished by varying the direction of the axis of the engine discharge, for example, by vectoring, that is, changing the orientation of the discharge directed to a vectoring nozzle for a rocket engine. nozzle of the engine. In the case of aircraft or missiles having such a rocket or jet engine for propulsion, the direction of the engine thrust may be varied to change the direction of flight, for example, to maintain a ballistic missile on a desired course.

An object of the invention comprises the provision of a rocket or other jet engine with a discharge nozzle having a novel and simple means to vary the direction of its thrust.

A further object resides in the provision of a jet engine nozzle with a rotatable wedge-shaped nozzle portion to vary the direction of the axis of the nozzle discharge or downstream portion.

Other objects of the invention will become apparent upon reading the annexed detail description in connection with the drawings in which:

FIG. 1 is a longitudinal sectional view through the axis of a rocket-engine vectoring nozzle, embodying the invention, as taken along line 1—1 of FIG. 3;

FIG. 2 is an enlarged view of portion "A" of FIG. 1;

Figure 3:
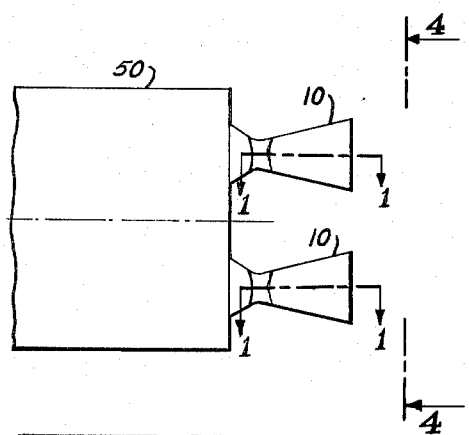
FIG. 3 is a schematic side elevation view of a dual exhaust rocket.

Referring to the drawings, the nozzle 10 preferably has three tubular portions including an upstream entrance portion 12, an intermediate portion 14 and a downstream exhaust portion 16.

In the position illustrated in FIG. 1, the intermediate portion 14 and exhaust portion 16 are arranged co-axially with the entrance portion 12 so that the nozzle exhaust thrust is directed along a nozzle axis 18. Since the three nozzle portions 12, 14 and 16 are also disposed in end-to-end relation, they form a continuous nozzle passage 20 therethrough with the inner surfaces of said three tubular portions forming the wall of said nozzle passage. The nozzle passage 20 preferably has a convergent-divergent profile.

With this end-to-end relation of said tubular parts 12, 14 and 16, one end of the intermediate portion 14 adjoins one end of the upstream portion 12, and the other end of the intermediate portion 14 adjoins one end of the downstream portion 16. Each pair of adjoining ends have a pair of flat end surfaces facing one another. Each end surface 22 and 24 of the intermediate portion 14 is flat and each is parallel to and substantially abuts the facing end surface of the adjoining portion 12 or 16, and preferably with a slight gap to reduce friction between said abutting end surfaces.

The two flat end surface portions 22 and 24 at the ends of the intermediate portion 14 are also inclined relative to each other so that the intermediate portion 14 has a wedge-shape construction. Preferably, the angle of inclination to the axis of said intermediate portion 14 of each of its flat end surface portions 22 and 24 are equal for ease of manufacture.

The cross-section of the nozzle passage 20 through the intermediate nozzle portion 14 at each of said intermediate nozzle portion and in the plane of its flat end surface portions 22 and 24 is preferably circular. In addition, the cross-section of the nozzle passage 20 of each of the upstream and downstream portions 12 and 16 adjacent to the intermediate nozzle portion 14 is also preferably circular in the plane of its flat end surface portion. In addition, the adjoining passage cross-sections are similar and preferably of substantially equal inside diameter for smooth fluid flow through the nozzle passage 20.

Each nozzle end portion 12 and 16 has an outwardly directed flange means 28 adjacent to its junction with the intermediate portion 14 forming the inner race for a bearing 30. The intermediate nozzle portion 14 at each junction with the adjacent nozzle portions also has an outwardly directed flange means 26 preferably of L-shape overlying the adjacent flange 28 of the end portion 12 or 16 and forming the outer race of said bearing 30.

The overlying flange 26 on each end of the intermediate nozzle portion 14 may be detachably secured to the intermediate nozzle portion 14 by means not shown for ease of assembly.

Therefore, the pair of flanges 26 and 28 at each junction permit relative rotation of the intermediate nozzle portion 14 and connect the tubular parts 12, 14 and 16 together against axial separation.

The bearing 30, which is preferably a ball bearing type, lies in a plane which is parallel to the planes of the flat end surfaces of the adjoining junction whereby one said end surface substantially lies against its adjoining end surface. Hence, the cooperating flanges 26 and 28 and ball bearing 30 provide a bearing connection between said intermediate nozzle portion 14 and each of the upstream and downstream nozzle parts 12 and 16 and permit relative rotation of said intermediate part 14 while maintaining said nozzle parts in close fitting end-to-end relation. In addition, said flanges 26 and 28 and ball bearing 30 preferably transmit substantially all axial and bending loads across the junctions of said tubular parts, and minimize bearing loads on the facing end surface portions of the tubular parts 12, 14 and 16. Moreover, with such construction, the necessary power for relative rotation of said intermediate tubular portion 14 is minimized.

The intermediate nozzle portion 14 has a sector of a ring gear 32 which extends radially outwardly and which also lies in a plane parallel to the junction between the upstream nozzle portion 12 and said intermediate nozzle portion 14. Said ring gear 32 rotates the intermediate nozzle portion 14 so that the axis of the downstream nozzle portion 16 generates a curved surface.

As illustrated in FIG. 2, one form of power drive means, which is mounted on the upstream nozzle part 12, preferably includes a spur gear 34 for rotating said ring gear 32 and includes a speed reducer assembly and a suitable motor (not shown). Said speed reducer assembly, which is held by a mounting bracket 35 and is driven by said motor (not shown), has a spur gear 34 which meshes with and turns said ring gear 32. The speed reducer assembly also includes a worm gear 36 connected co-axially with the motor shaft and a pinion gear 38 which meshes with the worm gear 36 and which is fixedly and co-axially mounted on a spindle shaft 40 alongside the spur gear 34. In this way, said spur gear 34 is turned by the worm and pinion gears 36, 38 and itself turns the ring gear 32 so that the intermediate nozzle portion 14 is rotated relative to the upstream nozzle portion 12.

A U-shaped guide member 41 is mounted on the upstream nozzle portion 12 preferably extending from the mounting bracket 35 and extends over a portion of the downstream nozzle portion 16 with its flanges pointing radially inwardly. A guided spoke 42, which also preferably lies in a plane parallel to its adjacent junction, projects radially outwardly from downstream nozzle portion 16, carrying a roller wheel which projects inside the channel member between its flanges, so that the upstream and downstream nozzle parts 12, 16 are interconnected and said downstream part 16 is restrained against joint rotation wth the intermediate nozzle part 14 whereby the axis of the downstream nozzle part 16 can be changed in orientation in response to the rotation of the intermediate nozzle part 14.

At each junction of the nozzle portions 12, 14, 16 each of the pair of end surfaces has a circular groove 44. Each pair of cooperating grooves 44 are of equal diameter and co-axial for receiving a circular seal member 43, which preferably is a conventional seal with a chevron-type cross-section which is compressible so that it bears against the bottom surface of each of its grooves 44 and provides good sealing. Further, the grooves 44 are located radially outward from the nozzle passage 20 and remotely from the hot gases so that the seals 43 remain cool whereby the life of said seals is prolonged.

The tubular nozzle parts 12, 14 and 16 are preferably made of casing plates, the interior of which are lined with insulation. The type of insulation on the upstream and downstream nozzle parts 12 and 16 can be a compressed, molded plastic 46 and the type of insulaton on the intermediate nozzle part 14 can be a graphite or ceramic type 48. The lining 48 of said intermediate portion 14 forms the throat of said nozzle passage 20.

The casing plates at the junctions of the tubular nozzle parts 12, 14 and 16 are preferably also circular in section while the sectional shape of the casing plate in-between the junctions and on each side of the junctions may be a faired shape so that the interior surface of the nozzle casing also has a continuous smooth surface in addition to the insulation wall of the nozzle passage 20.

In a single exhaust rocket in which the upstream nozzle portion 12 is preferably co-axial with its rocket, the axis of the vectoring downstream nozzle portion 16 is co-linear along a common straight line with the upstream nozzle portion 12 when the axis of the wedge-shaped intermediate nozzle portion 14 is similarly co-linear with the upstream portion axis as illustrated in FIG. 1. Moreover, by rotating the intermediate nozzle portion 14, the axis of the downstream portion 16 can move through a curved plane so that the change in the direction of its thrust can control the direction of the rocket flight path. However, with such nozzle construction the nozzle cannot maintain its thrust in a single plane.

Figure 4:
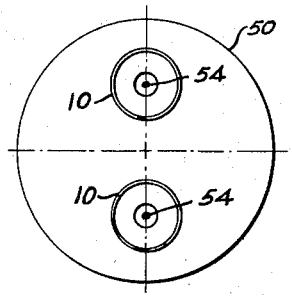
FIG. 4 is an end view as taken along line 4—4 of FIG. 3.
Figure 5:
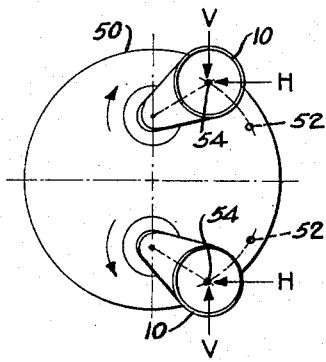
FIG. 5 is an end view similar to FIG. 4 except with the axes of the engine nozzles reoriented.

As illustrated in FIGS. 3 and 4, in an additional embodiment of the invention a rocket has two such nozzles 10 disposed preferably an equal distance on each side of the rocket axis, and as shown by the arrows in FIG. 5 with the intermediate portion 14 of one nozzle turning oppositely to that of the other nozzle. Thus, each nozzle 10 and its wedge-shaped intermediate portion 14 is arranged relative to its counterpart nozzle 10 so that the centers 54 of the outboard end faces of said pair of nozzles have identical but oppositely arranged travel paths 52. It is noted that said paths 52 in FIG. 5 have been exaggerated for purposes of illustration. In addition, said travel path of one nozzle is a mirror image of the travel path of its counterpart nozzle. In this way by using two similar nozzles 10 having equal thrust, the vertical force components "V" of the thrusts cancel each other, and their horizontal force components "H" are parallel, act in the same direction and are equidistant from the rocket axis. Thus, the dual nozzle rocket 50 is steerable in a curved line flight path which lies in a plane during the time interval while the nozzle tilt angles are varied, instead of a three dimensional flight path of a single nozzle rocket. Hence, to achieve certain flight courses as at lift-off, a rocket 50 preferably has a pair of nozzles 10 as a single nozzle gives forces not desired during the tilting of its nozzle downstream portion and by the use of at least two such nozzles 10, these undesired forces can be cancelled out.

Although the nozzle construction according to the invention has been shown together with a rocket it is equally applicable in any jet engine or turbo-compound engine.

While we have described our invention in detail in its present preferred embodiment it will be obvious to those skilled in the art after understanding our invention that various changes and modifications may be made therein without departing from the spirit or scope thereof. It is intended by the appended claim to cover all such modifications.

What is claimed is:

A vectoring nozzle construction for a rocket engine or the like comprising upstream, downstream and intermediate tubular nozzle parts disposed in adjacent end-to-end relation to form a continuous converging-diverging nozzle passage for smooth gas flow therethrough, the adjoining ends of the intermediate nozzle part and the upstream nozzle part having flat and parallel substantially abutting end surface portions and the adjoining ends of the intermediate nozzle part and the downstream nozzle part likewise having flat and parallel substantially abutting end surface portions with the two flat end surface portions of the intermediate nozzle part being inclined relative to each other to provide the intermediate nozzle part with a wedge-shaped construction, the intermediate section forming the throat of the nozzle passage and being of short axial extent relative to the upstream and downstream parts, the cross-section of the nozzle passage through the intermediate nozzle part at each end of said wedge-shaped intermediate nozzle part and in the plane of its flat end surface portion being circular and the cross-section of the nozzle passage of each of the upstream and downstream nozzle parts adjacent to the intermediate nozzle part having a similar circular cross-section in the plane of its said flat end surface portion; means providing a bearing connection between said intermediate nozzle part and each of the upstream and downstream nozzle parts to permit relative rotation of the intermediate nozzle part while maintaining said nozzle parts in close fitting end-to-end relation; means carried by the upstream nozzle part for rotating the intermediate nozzle part about its axis relative to the upstream part; and means interconnecting he upstream and downstream parts to restrain the downstream nozzle part against joint rotation with the intermediate nozzle part but to permit a change in orientation of the axis of the downstream nozzle part in response to rotation of the intermediate nozzle part, and seal means disposed between each pair of said adjoining nozzle parts and radially outwardly of said passage for smooth gas flow.

References Cited by the Examiner

UNITED STATES PATENTS

| | | | |
|---|---|---|---|
| 2,612,747 | 10/1952 | Skinner | 60—35.6 |
| 2,933,891 | 4/1960 | Britt | 60—35.55 |
| 3,067,579 | 12/1962 | Olbrich | 60—35.55 |

FOREIGN PATENTS

| | | |
|---|---|---|
| 1,246,339 | 10/1960 | France. |
| 875,205 | 8/1961 | Great Britain. |

MARK NEWMAN, *Primary Examiner.*

SAMUEL LEVINE, *Examiner.*